(12) United States Patent
Green

(10) Patent No.: US 6,519,290 B1
(45) Date of Patent: Feb. 11, 2003

(54) INTEGRATED RADIO FREQUENCY INTERFACE

(75) Inventor: Gary Green, Pleasanton, CA (US)

(73) Assignee: Cypress Semiconductor Corp., San Jose, CA (US)

(*) Notice: Subject to any disclaimer, the term of this patent is extended or adjusted under 35 U.S.C. 154(b) by 0 days.

(21) Appl. No.: 09/523,507

(22) Filed: Mar. 10, 2000

(51) Int. Cl.⁷ .............. H04L 27/00; H04L 7/00; G06F 3/00
(52) U.S. Cl. .............. 375/259; 375/356; 710/9
(58) Field of Search ............... 375/130, 132, 375/133, 135, 136, 356, 354, 257, 259; 455/53.1, 54.1, 54.2, 56.1, 434, 437, 438; 370/431; 710/8–12

(56) References Cited

U.S. PATENT DOCUMENTS

| | | | |
|---|---|---|---|
| 5,404,374 A | * | 4/1995 | Mullins et al. ............. 375/130 |
| 5,870,385 A | * | 2/1999 | Ahmadi et al. ............. 455/447 |
| 5,960,344 A | * | 9/1999 | Mahany ....................... 455/432 |
| 6,005,884 A | * | 12/1999 | Cook et al. ................. 455/67.1 |
| 6,012,103 A | | 1/2000 | Sartore et al. .................. 710/8 |
| 6,115,823 A | * | 9/2000 | Velasco et al. ................ 710/16 |
| 6,138,019 A | * | 10/2000 | Trompower et al. ........ 455/436 |
| 6,141,719 A | * | 10/2000 | Rafferty et al. ............. 710/100 |
| 6,389,495 B1 | * | 5/2002 | Larky et al. ................... 710/53 |
| 6,408,351 B1 | * | 6/2002 | Hamdi et al. ................ 455/557 |

FOREIGN PATENT DOCUMENTS

GB    2-352-540 A  *  1/2001

* cited by examiner

Primary Examiner—Tesfaldet Bocure
(74) Attorney, Agent, or Firm—Christopher P. Maiorana, P.C.

(57) ABSTRACT

An apparatus that may be configured to generate a wireless radio signal in response to one or more first data signals. The wireless radio signal may comprise a single frequency hopping sequence configured to support one or more peripheral wireless network devices. The apparatus may also be configured to generate the one or more first data signals in response to the wireless radio signal.

20 Claims, 3 Drawing Sheets

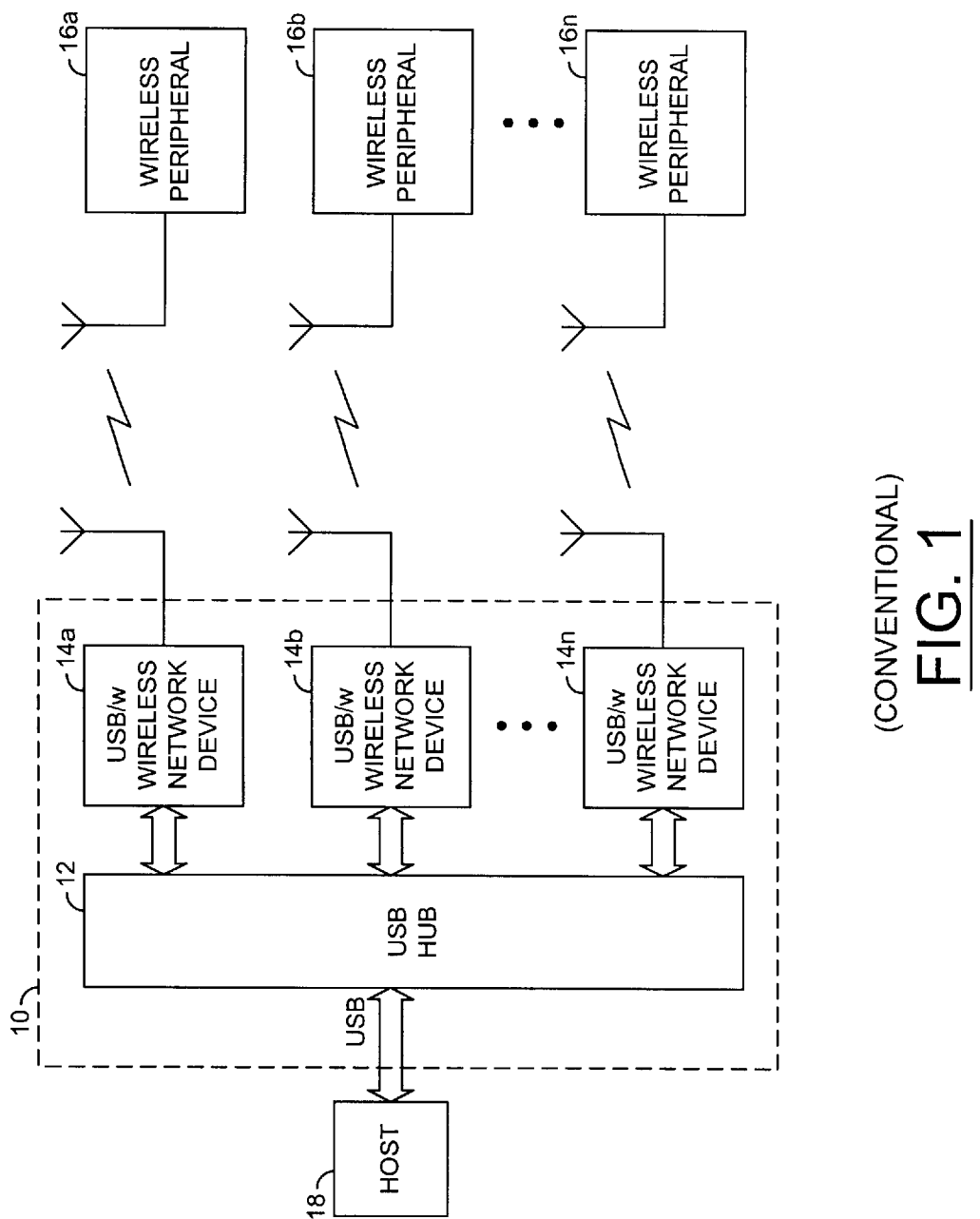
FIG. 1
(CONVENTIONAL)

INTEGRATED RADIO FREQUENCY INTERFACE

FIELD OF THE INVENTION

The present invention relates to peripheral wireless network devices generally and, more particularly, to a single apparatus, implementing one or more radio frequency hopping sequences, configured to support one or more peripheral wireless network devices.

BACKGROUND OF THE INVENTION

Wireless connectivity technology allows the replacement of a number of proprietary cables that connect one device to another with a universal short-range radio link. Printers, fax machines, keyboards, cellular phones, joysticks and virtually any other digital device can be part of a wireless system. Beyond untethering devices by replacing the cables, wireless technology provides (i) a universal bridge to existing data networks, (ii) a peripheral interface to the devices, and (iii) a mechanism to form small groupings of connected devices away from fixed network infrastructures.

An example of a conventional wireless protocol is the Bluetooth™ protocol (Bluetooth is a trademark of Telefonakiebolaget LM Ericsson, Stolkholm, Sweden). Conventional wireless protocols include a wireless host controller interface (HCI). The functional specifications of the Bluetooth HCI are described in the BLUETOOTH SPECIFICATION version 1.0A, published Jul. 24, 1999 (revised Dec. 1, 1999), which is hereby incorporated by reference in its entirety. The different functions in a conventional wireless protocol are (i) a radio unit, (ii) a link control unit, (iii) a link management system and (iv) software functions. Conventional HCI provides a command interface to the baseband controller, the link manager, and access to hardware status and control registers. The command interface provides a uniform method for accessing the wireless protocol baseband capabilities.

Referring to FIG. 1, a diagram illustrating a conventional wireless system 10 is shown. The system 10 generally comprises a Universal Serial Bus (USB) hub 12 and one or more wireless devices 14a–14n. An example of a Universal Serial Bus hub may be found in the Universal Serial Bus Specification, version 1.0, published Jan. 15, 1996, and the Universal Serial Bus Specification, version 1.1, published Jan. 15, 1998, updated Nov. 23, 1999, which are each hereby incorporated by reference in their entirety. The system 10 is shown connected to one or more peripheral devices 16a–16n and a host 18. The system 10 requires each wireless device 14a–14n to form a point-to-point connection with the Universal Serial Bus hub 12. A wireless network formed using the system 10 implements a separate wireless device 14a–14n for each peripheral 16a–16n. Furthermore, each wireless device 14a–14n generates a separate frequency hopping sequence and forms a separate piconet with the corresponding peripheral 16a–16n. A piconet is a collection of devices connected via wireless technology comprising 2 to 8 (or more) connected devices.

A wireless network formed using the system 10 to support multiple peripheral devices 16a–16n using conventional approaches comprises an equal number of wireless devices 14a–14n, potentially resulting in an expensive system. The system 10 supporting multiple peripheral devices 16a–16n will also form multiple piconets. Multiple piconets, where each piconet implements a separate frequency hopping radio sequence, may produce additional radio interference.

SUMMARY OF THE INVENTION

The present invention concerns an apparatus that may be configured to generate a wireless radio signal in response to one or more first data signals. The wireless radio signal may comprise a single frequency hopping sequence configured to support one or more peripheral wireless network devices. The apparatus may also be configured to generate the one or more first data signals in response to the wireless radio signal.

The objects, features and advantages of the present invention include providing (i) a single device comprising a minimum number of components configured to support one or more wireless connections, (ii) support for one or more wireless connections using a single frequency hopping sequence with minimal radio interference, (iii) a Universal Serial Bus hub connect/disconnect mapping function with wireless proximity connections and/or (iv) a single device configured to support multiple piconets where each piconet may operate on a unique frequency hopping sequence.

BRIEF DESCRIPTION OF THE DRAWINGS

These and other objects, features and advantages of the present invention will be apparent from the following detailed description and the appended claims and drawings in which:

FIG. 1 is a block diagram of a conventional wireless system;

DETAILED DESCRIPTION OF THE PREFERRED EMBODIMENTS

Figure 2:
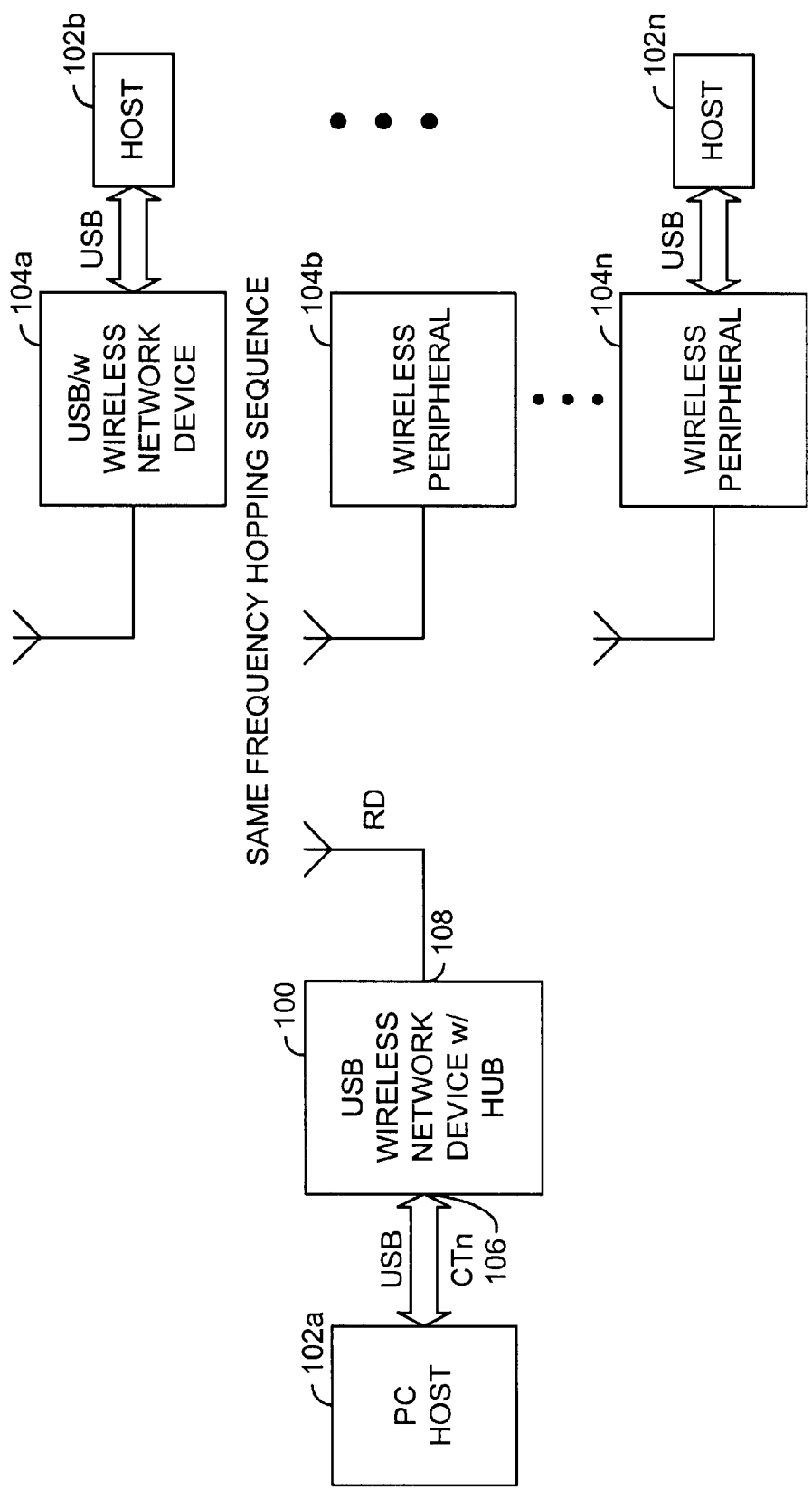
FIG. 2 is a block diagram illustrating a preferred embodiment of the present invention.

Referring to FIG. 2, a block diagram of a circuit 100 is shown in accordance with a preferred embodiment of the present invention. The circuit 100 may be implemented as a wireless network device with an integrated Universal Serial Bus (USB) hub. In one example, the wireless network device may be a Bluetooth wireless network device. However, other wireless devices and peripherals may be implemented accordingly to meet the design criteria of a particular implementation. The circuit 100 is shown connected to a circuit 102a via a USB bus connection and to one or more circuits 104a–104n via a radio connection. The circuits 104a–104n may be connected to one or more circuits 102b–102n. In one example, the circuits 102a–102n may be host circuits and the circuits 104a–104n may be wireless peripheral devices. While the circuit 100 is described in connection with a Universal Serial Bus application, other busses, such as an IEEE 1394 bus, may be implemented accordingly to meet the design criteria of a particular implementation.

The circuit 100 may have an input/output 106 that may receive or generate a control signal (e.g., CTn). The signal CTn may be presented to or received from the circuit 102a. The signal CTn may be n-bits wide, where n is an integer. A Universal Serial Bus generally implements a tiered star topology with a hub at the center of every star. Data transferred across a Universal Serial Bus may be formatted into packets and sent during one or more frames, where each frame is generally one millisecond long. The circuit 100 may have an input/output 108 that may generate or receive a radio signal (e.g., RD). The signal RD may be either generated in response to the control signal Ctn or received from the peripheral devices 104a–104n. In one example, the radio signal RD may comprise a single frequency hopping radio signal configured to support the one or more wireless peripheral devices 104a–104n. The circuit 100 and the circuits 104a–104n may comprise, in one example, a single multipoint piconet.

Figure 3:
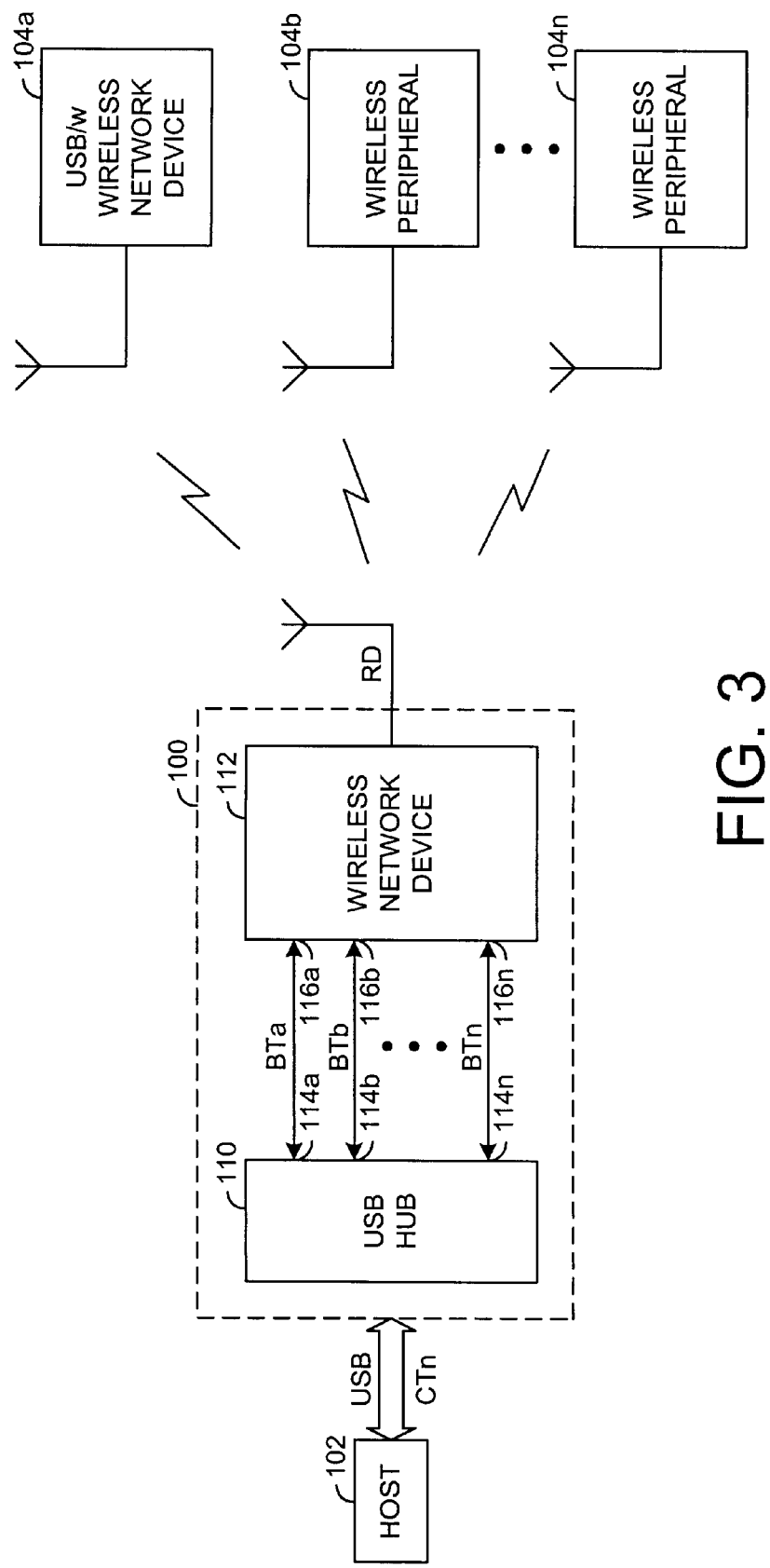
FIG. 3 is a more detailed block diagram of a preferred embodiment of the present invention.

Referring to FIG. 3, a detailed block diagram of the circuit 100 is shown in accordance with a preferred embodiment of the present invention. The circuit 100 generally comprises a circuit 110 and a circuit 112. In one example, the circuit 110 may be a Universal Serial Bus hub and the circuit 112 may be a wireless network device.

The circuit 110 may have one or more input/outputs 114a–114n. The input/outputs 114a–114n may be configured to either (i) generate one or more control signals (e.g., BTa–BTn) in response to the control signal CTn or (ii) receive one or more control signals (e.g., BTa–BTn) from the circuit 112. The USB endpoints for downstream ports may be integrated into the circuit 110 or the circuit 112. The circuit 102 may communicate with the circuits 104a–104n by using endpoints to send and receive data and/or commands to the selected circuit.

The circuit 112 may have one or more input/outputs 116a–116n. The input/outputs 116a–116n may be configured to either (i) generate one or more control signals (e.g., BTa–BTn) in response to the signal RD or (ii) receive one or more control signals (e.g., Bta–BTn) from the circuit 110. Furthermore, the circuit 112 may be configured to map proximity connections to the Universal Serial Bus hub 110 to control connect/disconnect functions so that the particular wireless peripheral devices 104a–104n that come into range may join the multipoint piconet and enumerate as Universal Serial Bus devices. An example of USB enumeration may be found in U.S. Pat. No. 6,012,103, which is hereby incorporated by reference in its entirety.

When one of the devices 104a–104n has been enumerated by the host 102, the host 102 may communicate with the particular device 104a–104n by using endpoints in the block 100 to send and receive data and/or commands to a selected peripheral 104a–104n. For example, if the host 102 wants to send data to the peripheral 104b, the host 102 may send data to the USB endpoints in the block 100 that may address a particular wireless peripheral (e.g., 104b). The block 100 generally formats and sends data from the USB endpoint using wireless transmission across the interface 112 to the particular peripheral (e.g., 104b). If the particular peripheral 104b needs to send data back to the host 102, then the peripheral 104b generally transmits data across the interface 112. The data may be written into the USB endpoints of the block 100. The block 100 will notify the host 102 (e.g., according to the USE specification) that the peripheral 104a–104n has data to send. The host 102 will transfer data across the USB bus from the USB endpoints in the block 100.

The connections that form the multipoint piconet may be added in any order. In general, the first peripheral 104a–104n will be the piconet master. In general, either a single piconet or a scatternet (e.g., overlapped piconets) may be formed.

In one example, a multipoint piconet may be formed with the device 112 as the master and the peripherals 104a–104n as the slaves. Such an example may occur when the peripheral 104a comes into range of the device 112. The device 112 may initiate a successful connection to peripheral 104a. The first connection may have a unique frequency hopping sequence based on a serial number in the device 112 and the time of connection. In one example, the hopping sequence may be determined by a serial number (e.g., a 48-bit number) contained in each of the peripherals 104a–104n. While remaining connected to the peripheral 104a, the device 112 will continue looking for additional peripheral devices 104a–104n with a paging frequency hopping sequence that is independent of the connection hopping sequence. This may be accomplished, in one example, according to the wireless protocol by using spare time slots in the connection hopping sequence for the paging sequence.

When the device 112 establishes a wireless connection with the peripheral 104a, the device 112 may signal a USB connection event to the USB hub 110. The USB hub 110 may notify the host controller in the host 102 of the connection event. The host controller may then perform an enumeration sequence. The device 112 may need to provide USB endpoints for the device 104a on the USB interface 114a. The USB descriptors for the device 104a may need to be available to the device 112. There are at least three known ways of providing USB descriptors for the peripheral 104a (i) the appropriate descriptors may be resident on the device 112, (ii) the necessary descriptors are transferred from the peripheral 104a during wireless connection and initialization, and (iii) descriptors may be downloaded from host 102 on request. The wireless connection between the device 112 and the peripheral 104a generally remains transparent to host 102, similar to the approach in FIG. 1.

If another peripheral (e.g., 104b) moves into range of the device 112, the device 112 may initiate a successful connection to the peripheral 104b on the same unique frequency hopping sequence of the connection between the device 112 and the peripheral 104a. In such an example, the piconet may comprise three devices (e.g., 112, 104a, and 104b) that may all be using the same frequency hopping sequence determined by the master (e.g., the device 112). Similarly, a third and a fourth (or more) peripheral 104a–104n may be added to the piconet as needed.

Integrating the USB hub 110 into the wireless interface 100 may allow the wireless interface 100 to provide endpoints and a connection state machine for each supported downstream port in the USB hub 110. The individual wireless peripherals 104a–104n may all be simple devices that are naturally supported by the host controller 102.

The present invention may allow one or more wireless devices to transparently connect to a host through a wireless controller with, in one example, an integrated USB hub. The wireless devices may be configured as standard USB hardware that may be supported by current operating systems. The present invention may (i) reduce radio interference by supporting multiple connections and (ii) provide USB connect/disconnect functionality for wireless devices.

While particular aspects of the present invention have been described in the context of USB applications, other applications (e.g., IEEE 1394, serial, etc.) may also be implemented. The circuit 100 may be used to achieve demanding cost targets, such as designing low-cost mouse controllers.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
   a circuit configured to generate a wireless radio signal in response to one or more first data signals, wherein said wireless radio signal comprises a single frequency hopping sequence configured to support one or more peripheral wireless network devices, said circuit is configured to generate one or more first data signals in response to said wireless radio signal.

2. The apparatus according to claim 1, wherein said apparatus is configured to either (i) present said first data signal to or (ii) receive said first data signal from a host.

3. The apparatus according to claim 2, wherein said host communicates with said circuit by implementing one or more endpoints to send and receive data and/or commands to a selected peripheral.

4. The apparatus according to claim 3, wherein said first data signals are n-bits wide, where n is an integer.

5. The apparatus according to claim 4, wherein said single frequency hopping sequence and said one or more peripheral devices comprises a piconet.

6. The apparatus according to claim 5, wherein said circuit is further configured to support a plurality of piconets each operating on a unique frequency hopping sequence.

7. The apparatus according to claim 6, wherein said piconet is formed with said circuit as a master and said peripheral devices as one or more slaves.

8. The apparatus according to claim 1, wherein said circuit comprises a Universal Serial Bus hub.

9. The apparatus according to claim 8, wherein said Universal Serial Bus hub implements a tiered star topology with a hub at the center of every star.

10. The apparatus according to claim 1, wherein said circuit includes a Bluetooth wireless network device.

11. The apparatus according to claim 10, wherein said apparatus maps one or more Bluetooth proximity connections to generate connect/disconnect functions in said Universal Serial Bus hub.

12. The apparatus according to claim 11, wherein mapping said proximity connections allows each of said wireless peripheral network devices that come into range to join said piconet and enumerate as a Universal Serial Bus device.

13. An apparatus comprising:
    means for generating a wireless radio signal in response to one or more first data signals, wherein said wireless radio signal comprises a single frequency hopping sequence configured to support one or more peripheral wireless network devices; and
    means for generating one or more first data signals in response to said wireless radio signal.

14. A method for connecting one or more peripheral wireless network devices with a host comprising the steps of:
    (A) generating a wireless radio signal in response to one or more first data signals, wherein said wireless radio signal comprises a single frequency hopping sequence configured to support one or more peripheral wireless network devices; and
    (B) generating said one or more first data signals in response to said wireless radio signal.

15. The method according to claim 14, further comprising the step of:
    presenting said first data signals to or receiving said first data signals from a host.

16. The method according to claim 15, wherein said host communicates with said circuit by implementing one or more endpoints to send and receive data and/or commands to a selected peripheral.

17. The method according to claim 16, further comprising the step of:
    supporting a plurality of piconets wherein each piconet operates on a unique frequency hopping sequence.

18. The method according to claim 17, further comprising the step of:
    forming a single piconet while supporting said one or more peripheral wireless network devices.

19. The method according to claim 18, further comprising the step of:
    mapping one or more Bluetooth proximity connections to generate a connect/disconnect function in a Universal Serial Bus hub.

20. The method according to claim 19, further comprising the step of:
    mapping said peripheral wireless network devices that come into range to join said piconet and enumerate as a Universal Serial Bus device.

* * * * *

UNITED STATES PATENT AND TRADEMARK OFFICE
CERTIFICATE OF CORRECTION

PATENT NO.    : 6,519,290 B1
DATED         : February 11, 2003
INVENTOR(S)   : Gary Green It is certified that error appears in the above-identified patent and that said Letters Patent is hereby corrected as shown below:

Column 4, line 65 through Column 5, line 5,
Claim 1 should read as follows:
    1. An apparatus comprising:
    a circuit configured to generate a wireless radio signal in response to one or more first Universal Serial Bus (USB) data signals, wherein said wireless radio signal comprises a single frequency hopping sequence configured to support one or more USB peripheral wireless network devices, and said circuit is configured to (i) generate said one or more first USB data signals in response to said wireless radio signal and (ii) enumberate said one or more USB devices.

Column 5, line 39 through Column 6, line 4,
Claim 13 should read as follows:
    13. An apparatus comprising:
    means for generating a wireless radio signal in response to one or more first Universal Serial Bus (USB) data signals and enumerating one or more USB peripheral wireless network devices, wherein said wireless radio signal comprises a single frequency hopping sequence configured to support said one or more USB peripheral wireless network devices; and
    means for generating said one or more first USB data signals in response to said wireless radio signal.

Column 6,
Line 5, claim 14 should read as follows:
    14. A method for connecting one or more peripheral wireless network devices with a host comprising the steps of:
    (A) generating a wireless radio signal in response to one or more first Universal Serial Bus (USB) data signals and enumerating one or more USB peripheral wireless network devices, wherein said wireless radio signal comprises a single frequency hopping sequence configured to support said one or more USB peripheral wireless network devices; and

UNITED STATES PATENT AND TRADEMARK OFFICE
CERTIFICATE OF CORRECTION

PATENT NO. : 6,519,290 B1
DATED : February 11, 2003
INVENTOR(S) : Gary Green

It is certified that error appears in the above-identified patent and that said Letters Patent is hereby corrected as shown below:

Column 6 (cont'd),
      (B) generating said one or more first USB data signals in response to said wireless radio signal.

Signed and Sealed this

Twenty-second Day of March, 2005

JON W. DUDAS
*Director of the United States Patent and Trademark Office*